US 008819253B2

(12) United States Patent (10) Patent No.: US 8,819,253 B2
Simeloff et al. (45) Date of Patent: Aug. 26, 2014

(54) NETWORK MESSAGE GENERATION FOR AUTOMATED AUTHENTICATION

(75) Inventors: Ezra Simeloff, London (GB); Paul Kane, London (GB)

(73) Assignee: Oracle America, Inc., Redwood City, CA (US)

( * ) Notice: Subject to any disclaimer, the term of this patent is extended or adjusted under 35 U.S.C. 154(b) by 3711 days.

(21) Appl. No.: 10/293,199

(22) Filed: Nov. 13, 2002

(65) Prior Publication Data

US 2003/0093539 A1 May 15, 2003

Related U.S. Application Data

(60) Provisional application No. 60/338,144, filed on Nov. 13, 2001.

(30) Foreign Application Priority Data

Nov. 13, 2001 (GB) .................................. 0127257.4

(51) Int. Cl.
*G06F 15/16* (2006.01)
*H04L 29/06* (2006.01)
*G06F 21/62* (2013.01)
*H04L 29/08* (2006.01)
*H04L 9/32* (2006.01)
*H04L 9/00* (2006.01)

(52) U.S. Cl.
CPC ........ *H04L 63/0853* (2013.01); *G06F 21/6218* (2013.01); *G06F 21/62* (2013.01); *H04L 63/0823* (2013.01); *H04L 67/02* (2013.01); *H04L 9/3247* (2013.01); *H04L 9/3263* (2013.01); *H04L 9/3281* (2013.01); *H04L 9/006* (2013.01)
USPC ........................................ 709/229

(58) Field of Classification Search
USPC .......................................................... 709/229
See application file for complete search history.

(56) References Cited

U.S. PATENT DOCUMENTS 5,812,688 A * 9/1998 Gibson .......................... 381/119
5,862,325 A * 1/1999 Reed et al. .................... 709/201
(Continued)

FOREIGN PATENT DOCUMENTS

EP 565 314 10/1993
EP 1094424 4/2001
(Continued)

OTHER PUBLICATIONS

J.S. Park and R. Sandhu; "Secure Cookies on the Web"; Jul.-Aug. 2000; IEEE Internet Computing; pp. 36-44.*

(Continued)

*Primary Examiner* — Ario Etienne
*Assistant Examiner* — Blake Rubin
(74) *Attorney, Agent, or Firm* — Meyertons Hood Kivlin Kowert & Goetzel, P.C.; Jeffrey C. Hood

(57) ABSTRACT

A message generation mechanism for a network interface is provided. The message generation mechanism is operable to generate a message which includes data for signing and authentication procedure instructions. The message is for conveying information to a user device for presentation to a user via a user interface of the user device. The data is arranged in the message in a manner which permits the user device to utilize the data in an automated signing procedure. The automated signing procedure may be a digital signing procedure. The data for signing may be random data, pseudo-random data or secure random data and may be arranged in the message in a manner which avoids presentation to the user.

30 Claims, 17 Drawing Sheets

(56) References Cited

U.S. PATENT DOCUMENTS

| | | | |
|---|---|---|---|
| 5,875,296 A * | 2/1999 | Shi et al. | 726/5 |
| 5,931,917 A * | 8/1999 | Nguyen et al. | 709/250 |
| 6,039,248 A | 3/2000 | Park et al. | |
| 6,226,752 B1 * | 5/2001 | Gupta et al. | 726/9 |
| 6,263,437 B1 * | 7/2001 | Liao et al. | 713/169 |
| 6,314,425 B1 * | 11/2001 | Serbinis et al. | 1/1 |
| 6,317,829 B1 * | 11/2001 | Van Oorschot | 713/155 |
| 6,523,027 B1 * | 2/2003 | Underwood | 707/4 |
| 6,651,166 B1 * | 11/2003 | Smith et al. | 713/150 |
| 6,694,025 B1 * | 2/2004 | Epstein et al. | 380/279 |
| 2001/0011250 A1 * | 8/2001 | Paltenghe et al. | 705/41 |
| 2002/0002688 A1 * | 1/2002 | Gregg et al. | 713/202 |
| 2002/0031230 A1 * | 3/2002 | Sweet et al. | 380/278 |
| 2002/0147735 A1 * | 10/2002 | Nir | 707/200 |

FOREIGN PATENT DOCUMENTS

| | | |
|---|---|---|
| GB | 2 318 486 | 4/1998 |
| WO | 01/20431 | 3/2001 |
| WO | 01/86601 | 11/2001 |
| WO | 02/091145 | 11/2002 |

OTHER PUBLICATIONS

J.S. Park and R. Sandhu; "Smart Certificates: Extending X.509 for Secure Attribute Services on the Web"; 1999; U.S. Government Printing Office, Proc. 22nd National Information System Security Conference.*

International Search Report for GB 0127257.4, mailed Jul. 25, 2002, 3 pages.

International Search Report for GB 0127257.4, mailed Jan. 15, 2003.

* cited by examiner

```
<HTML>
<head>
<script>
function doSign()
{
   document.myForm.EnclosedCertificate.value = document.attachApplet.sign(
document.myForm.random.value );    ← L10
   document.myForm.submit();   ← L12
}
</script>
⋮
<title>SmartCard Login Example</title>
</head>
<body OnLoad="doSign();">    ← L14
⋮
<input type="hidden" name="random" value="REPLACETHISSTRING"</input>
⋮
</BODY>
</HTML>
```

The script block is labeled 90.

FIGURE 7

Login page.

Beginning the smartcard challenge ( Smartcard software Interaction ).

: Login Ok Page Received.

110

NETWORK MESSAGE GENERATION FOR AUTOMATED AUTHENTICATION

BACKGROUND OF THE INVENTION

This invention relates to generating messages, in particular to generating messages for use in authentication of a user across a network. The invention also relates to authentication, in particular to user authentication across a network.

In recent years, electronic communication between a network device and a user device has become commonplace. The network device typically uses a network interface to send messages to the user device. The user device, which may be a computer, mobile phone or other device, typically has a user interface which can display the messages to a user. Often there is a need for the user to authenticate their identity to the network device. A common approach to authentication is to use logon passwords, where the network device checks the username and password against a stored record of valid username/password combinations.

Another approach for authenticating the user's identity uses an encryption infrastructure such as the Public Key Infrastructure (PKI). Using PKI, a user can digitally sign data using a private key of a private/public key pair. The network device can then authenticate the user's identity by decrypting the signed data using the public key of the key pair before analysing the data, for instance by checking the decrypted data against a record of the unsigned data.

If the same signed data is used for repeated authentication of a user, there is a risk that a third party may impersonate the user by simply repeating previously transmitted signed data. To avoid this, data for signing by the user device can be generated each time the user initiates communication with the network device.

Approaches to authenticating a user's identity have been developed which involve the passing of digital certificates issued and verified by a Certificate Authority. Such approaches are of particular use in commercial transactions conducted over a computer network, such as the Internet. A digital certificate usually comprises the user's public key and username, and typically identifies a chain of certification from the certification authority down to the certificate. The chain of certification can be checked by a network device during authentication of a user.

A user's digital certificate and/or private key can be stored locally for use by the user device.

SUMMARY OF THE INVENTION

Particular aspects of the invention are set out in the accompanying independent and dependent claims. Combinations of features from the dependent claims may be combined with features of the independent claims as appropriate and not merely as explicitly set out in the claims.

An aspect of the invention provides a message generation mechanism for a network interface. The message generation mechanism is configured to generate a message which includes data for signing and authentication procedure instructions. The message is used to convey information to a user device for presentation to a user via a user interface. The data is arranged in the message in a manner to permit the user device to utilise the data. The data is utilised by the user device in an authentication procedure. In a particular embodiment the authentication procedure is an automated signing procedure. The automated signing procedure may be a digital signing procedure. The instructions are implementable by the user device to effect automatic initiation of the procedure.

A network device using the mechanism provides data for signing by the user device. By including the data in a message containing information for presentation to the user, the data can be sent together with the message. As a result, the need to send a separate transmission containing the data for signing is removed. The instructions reduce the need for direct user involvement in the signing procedure, in particular the number of steps the user has to perform. The user experience is thus improved. Further, the user is unaware of the source of the data.

The data for signing may be provided so that the data varies each time a message is modified, for instance random data or pseudo-random data. Thus, if a message containing data signed by a user is intercepted by a third party, the third party is inhibited from re-using the intercepted signed data to impersonate or "spoof" the identity of the user. This is because the intercepted signed data should not correspond to data subsequently provided for signing. An embodiment of the message generation mechanism provides secure random data for signing by the user. Secure random data is secure in the sense that the data generated for signing by a user is not repeated for subsequent signings. The data is random in the sense that its value is typically non-predictable by the user.

The information contained in the message is for presentation to a user through a user interface. The data may be arranged in the message in a manner to avoid presentation of the data to the user through the user interface. As a result, when the message is received by a user device, the data is not presented to the user through the user interface and the user interface experience is uninterrupted or unperturbed by the data.

The message may include control elements for controlling the presentation of the information, and may also include control elements for controlling the presentation of the data. The message may include or be written in a markup language, such as Hypertext Markup Language (HTML). The control elements in a markup language are commonly known as "indicators" or "tags".

Additionally or optionally, the message may include return instructions to effect automatic return of the signed data from the user device. Such instructions further reduce the need for direct user involvement in the signing procedure, in particular the number of steps the user has to perform. The user experience is thus improved.

Suitably, the authentication procedure instructions may be to effect automatic initiation of signing of the data with an authentication token, such as a key stored for use by the user device. In one embodiment, the authentication procedure instructions are for automatic signing with a private key stored on a smartcard. In certain embodiments, the authentication procedure and/or return instructions are written in a script language. The script language may be a user device-side script language such as JavaScript.

Another aspect of the invention provides a network interface for providing messages in response to user requests. The network interface includes a message generation mechanism as set out in the foregoing paragraphs. The network interface may also include a mechanism configured to receive a user request and provide a corresponding message. The network interface may be configured to provide an initial message to a user device in response to a contact request. The initial message enables the user to make an access request, for example. The network interface may be further configured to provide a subsequent message in response to an access request. The subsequent message includes data for signing and authentication procedure instructions.

The initial message may be a static message and the subsequent message may be a dynamic message. A static message contains information which is pre-defined whereas a dynamic message contains information or data which has been dynamically assembled or generated by the network device. This arrangement of initial and subsequent messages assists in protecting against attacks made by way of repeatedly sending access request messages to the network device.

The network interface may be configured to analyse signed data returned from a user device to authenticate the user. Responsive to positive authentication the user may be granted access to resources on the network device. Optionally, the network interface may act as a gateway to other resources, such as another server or service network.

Another aspect of the invention provides a message for conveying information to a user via a user interface of the user device. The message includes data for signing arranged in the message in a manner which permits the user device to utilise the data, for example in an automated authentication procedure such as a signing procedure. The message further includes authentication procedure instructions which are implementable by the user device to effect automatic initiation of the procedure.

Another aspect of the invention provides a signal including a message including data for signing and authentication procedure instructions. The message conveys information to a user device for presentation to a user via a user interface. The data is arranged in the message in a manner to permit the user device to utilise said data in an authentication procedure, for instance in an automated signing procedure. The instructions are implementable by the user device to effect automatic initiation of the procedure.

A further aspect of the invention provides a program element including program code operable to provide a message generation mechanism or network interface as defined above. The program element can be provided on a carrier medium.

In another aspect, the invention provides a program element on a carrier medium, the program element including program code operable to provide a message generation mechanism operable to generate a message which includes data for signing and authentication procedure instructions, the message being for conveying information to a user device for presentation to a user via a user interface of said user device, wherein said data is arranged in said message in a manner which permits said user device to utilise said data in an authentication procedure, for example in an automated signing procedure. The instructions are implementable by the user device to effect automatic initiation of the procedure.

In a further aspect, the invention provides a program element on a carrier medium, the program element including program code operable to provide a network interface comprising a message generation mechanism operable to generate a message which includes data for signing and authentication procedure instructions, the message being for conveying information to a user device for presentation to a user via a user interface of said user device, wherein said data is arranged in said message in a manner which permits said user device to utilise said data in an authentication procedure, for example in an automated signing procedure. The instructions are implementable by the user device to effect automatic initiation of the procedure.

Examples of suitable carrier media include one or more selected from: a radio frequency signal, an optical signal, an electronic signal, a magnetic disk or tape, solid state memory, an optical disk, a magneto-optical disk, a compact disk and a digital versatile disk.

Another aspect of the invention provides a computer system including memory, a processor and a message generation mechanism or a network interface as defined above. The computer system can connect to one or more user devices via a network to form a computer network.

In another aspect, the invention provides a server comprising the computer system defined above.

Another aspect of the invention provides a user device including memory, a processor and a user interface for presenting information to a user. The user device is operable to receive a message containing information for presentation to the user via the user interface, the message including data for signing and authentication procedure instructions. The user device is further operable to utilise said data in an authentication procedure, for example in an automated signing procedure. The user device may be a computer system, telephone, mobile telephone, personal digital assistant, digital television, set top box or a device combining two or more of these, for example. The user device is operable to implement the instructions to automatically initiate the procedure.

Yet another aspect of the invention provides a method for providing messages for use in user authentication. The method includes providing a message to a user device. The message includes data for signing and authentication procedure instructions. The message conveys information to the user device for presentation to a user via a user interface of the user device. The data is arranged in the message in a manner which permits the user device to utilise said data in an authentication procedure, for example in an automated signing procedure. The instructions are implementable by the user device to effect automatic initiation of the procedure.

The method may include providing an initial message to a user device in response to a contact request. The initial message is arranged to enable a user to make an access request and the method further includes providing a subsequent message to the user device in response to an access request. The subsequent message includes data for signing and authentication procedure instructions. The initial and subsequent messages are for conveying information to the user device for presentation to a user via a user interface. The data is arranged in the subsequent message in a manner to permit the user device to utilise said data in an authentication procedure, for instance in an automated signing procedure. The instructions are implementable by the user device to effect automatic initiation of the procedure.

Yet a further aspect of the invention provides a method for receiving data for signing in a user authentication. The method includes receiving a message. The message includes data for signing and authentication procedure instructions. The message conveys information to a user device for presentation to a user via a user interface. The data is arranged in a manner which permits the user device to utilise the data in an authentication procedure, for example in an automated signing procedure. The instructions are implementable by the user device to effect automatic initiation of the procedure.

The method may include sending a contact request to a network device and receiving an initial message in response to the contact request. The initial message is configured to enable an access request to be made. The method may further include sending an access request and receiving a subsequent message in response to the access request. The subsequent message includes data for signing and authentication procedure instructions. The data is arranged in the message in a manner which permits the user device to utilise the data in an authentication procedure, for example in an automated signing procedure. The instructions are implementable by the user device to effect automatic initiation of the procedure. The initial and subsequent messages are for conveying information from the network device to a user device for presenting said information to a user via a user interface. The method may further include implementing the instructions to automatically initiate an automated signing procedure and utilising the data in the automated signing procedure to sign the data. The method may further include sending the signed data to the network device.

According to another aspect, the invention provides an authentication mechanism for a network interface. The authentication mechanism is operable to provide a message for communication to a user device, the message including data for signing by a user of the user device and to receive signed data communicated from the user device, to check the signed data to authenticate the user. Responsive to positive authentication of the user, the mechanism is operable to provide an authentication entity for storage in a memory of the user device and communication between the user device and a network device. The authentication entity includes entity data and signed entity data, and wherein the signed entity data is signed by a network device key and the entity data comprises a user identifier, identifying a user.

The signed entity data is data which has been signed by the network device key. The signed entity data may have been hashed as well as signed. The network device key is a secure key in that the key is not generally available to users. Thus, the key can be used by the network device to initially generate the signed entity data. The signed entity data can then subsequently be checked by the network device to verify that the signed entity data was generated by the network device and that the user identified by the user identifier has previously been authenticated. In a particular embodiment the signed entity data is a signed version of the entity data. This signed version may also have been hashed.

Authentication of a user can be performed by the network device which typically involves the user and network device following a series of actions such as the passing and checking of digital certificates and the signing of data. On positive authentication of a user, the network device can provide or generate the authentication entity and communicate or transmit the authentication entity to the user device. The user device can store the authentication entity and then transmit the authentication entity to the network device to authenticate the user to the network device. Typically the authentication entity is transmitted to the network device together with a user request. The network device can use the authentication entity transmitted with a request to authenticate the user without the user and network device repeating the series of actions. This is because the entity data identifies the user and the signed entity data can be used to establish that the entity data has not been tampered with. In other words, if the entity data and signed entity data correspond (i.e. signing the entity data with the network device key generates data that matches the signed entity data or alternatively decrypting the signed entity data with the corresponding key generates data that matches the entity data) then the entity data and signed entity data can be used to establish that the user has been previously positively authenticated by the network device.

The entity data may include an expiry identifier, identifying when the authentication entity expires, and this can be used to limit the period in which the authentication entity is effective for authenticating the user. The network device can use the expiry identifier to check that the authentication entity is effective or valid and, if it is valid, to allow the user access to requested resource. Otherwise access would be denied.

The entity data may include a network device key identifier, identifying the network device key. This can be used where the network device uses more than one key, for example in an environment where keys used by the network device are updated periodically for security reasons. Thus the key used to sign the entity data to create the signed entity data is used when checking that these data correspond.

The entity data may include a user certificate identifier, identifying a user certificate. If the network device maintains a record of user certificate identifiers and usernames, the user certificate identifier can be used to check the identity of the user. This check can be performed to double-check the user's identity in addition to checking that the entity data and signed entity data correspond and using the user identifier to identify the user.

The entity data may include a secure link identifier, identifying a secure link between the user device and the network device. This can be used to check that the same secure link is being used between the user device and the network device as was used when the authentication entity was transmitted or issued to the user device. This check can be used as an additional check to ensure that there has been no breach in the security of the secure link.

The entity data and the signed entity data may be encoded to enable transmission of the authentication entity between the user device and the network device. In particular, the data may be encoded to a format which is transmittable using the transfer protocol implemented.

The authentication entity may be a transfer protocol "cookie" and in one embodiment is an HTTP cookie.

The authentication mechanism may be operable to provide the authentication entity by using the network device key to sign the entity data to form the signed entity data.

The authentication mechanism may further be operable to check a user request communicated from a user device for the presence of the authentication entity. Dependent on an authentication entity being present, the entity data and the signed entity data are checked to determine if the user is a positively authenticated user (a user previously authenticated by the network device). Dependent on the check indicating that the user is a positively authenticated user, the user is positively authenticated.

The authentication mechanism may be operable to check the entity data and signed entity data by retrieving the entity data from the authentication entity, retrieving the signed entity data from the authentication entity and signing the entity data with the network device key to form check-generated signed entity data. The check-generated signed entity data is compared with the retrieved signed entity data and it is determined that the user is a positively authenticated user in dependence on the check-generated signed entity data matching the retrieved signed entity data.

Where the authentication entity includes entity data including an expiry identifier identifying when the authentication entity expires, the authentication mechanism may be operable to check the expiry identifier to determine whether or not the authentication entity has expired and dependent on the authentication entity having not expired, to determine that the user is a positively authenticated user.

The message for sending to the user device may include authentication procedure instructions which are implementable by the user device to effect automatic initiation of an automated signing procedure.

Another aspect of the invention provides a network interface for providing messages in response to user requests, the network interface including the authentication mechanism as defined above. The network interface may include a mechanism operable to receive a user request and provide a corresponding message. In a particular embodiment the network interface is a web server.

A further aspect of the invention provides a program element including program code operable to provide an authentication mechanism or a network interface as defined above. The program element can be provided on a carrier medium.

In another aspect, the invention provides a program element on a carrier medium, the program element including program code operable to provide an authentication mechanism operable to provide a message for communication to a user device, the message including data for signing by a user of the user device to receive signed data communicated from the user device and to check the signed data to authenticate the user. Responsive to positive authentication of the user the program code is operable, to provide an authentication entity comprising entity data and signed entity data, wherein the signed entity data is signed by a network device key and the entity data includes a user identifier, identifying a user.

In a further aspect, the invention provides a program element on a carrier medium, the program element including program code operable to provide a network interface comprising an authentication mechanism operable to provide a message for communication to a user device, the message including data for signing by a user of the user device, to receive signed data communicated from the user device, and to check the signed data to authenticate the user. Responsive to positive authentication of the user the program code is operable, to provide an authentication entity comprising entity data and signed entity data, wherein the signed entity data is signed by a network device key and the entity data including a user identifier, identifying a user.

Examples of suitable carrier media include one or more selected from: a radio frequency signal, an optical signal, an electronic signal, a magnetic disk or tape, solid state memory, an optical disk, a magneto-optical disk, a compact disk and a digital versatile disk.

Another aspect of the invention provides a computer system including memory, a processor and an authentication mechanism as defined above. Yet another aspect of the invention provides a computer system including memory, a processor and a network interface as defined above. In another aspect, the invention provides a computer network including such a computer system connected to at least one user device via a network.

In a further aspect, the invention provides a method for authentication of a user. The method includes providing a message for communication to a user device, the message including data for signing by a user of the user device, receiving signed data communicated from the user device, and checking the signed data to authenticate the user. Responsive to positive authentication of the user, an authentication entity is provided for storage in a memory of a user device and communication between the user device and a network device. The authentication entity including entity data and signed entity data, wherein the signed entity data is signed by a network device key and the entity data comprises a user identifier, identifying a user.

The method may further include checking a user request communicated from a user device for the presence of the authentication entity. Dependent on an authentication entity being present, the entity data and the signed entity data are checked to determine whether or not the user is a positively authenticated user, dependent on the check indicating that the user is a positively authenticated user, the user is positively authenticated.

The message may include authentication procedure instructions which are implementable by the user device to effect automatic initiation of an automated signing procedure.

According to another aspect of the invention, there is provided a method for providing data for signing in user authentication, the method including providing a message to a user device, the message including data for signing and authentication procedure instructions, wherein the message conveys information to the user device for presentation to a user via a user interface. The data is arranged in the message in a manner which permits the user device to utilise said data in an authentication procedure, for example an automated signing procedure and in a manner which avoids presentation of the data to the user The instructions are implementable by the user device to effect automatic initiation of the automated signing procedure.

An embodiment of the present invention can provide a method for providing data for use in user authentication.

An embodiment of the present invention can provide a method for automatic authentication of a previously authenticated user.

An embodiment of the present invention can provide a method for signing and returning data for use in user authentication.

BRIEF DESCRIPTION OF THE DRAWINGS

Particular embodiments of the present invention will now be described, by way of example only, with reference to the accompanying drawings in which like reference signs relate to like elements. In the drawings:

FIG. 7 illustrates a portion of a file used in an example of a message generation mechanism in accordance with an embodiment of an aspect of the invention;

DESCRIPTION OF PARTICULAR EMBODIMENTS

Figure 1:
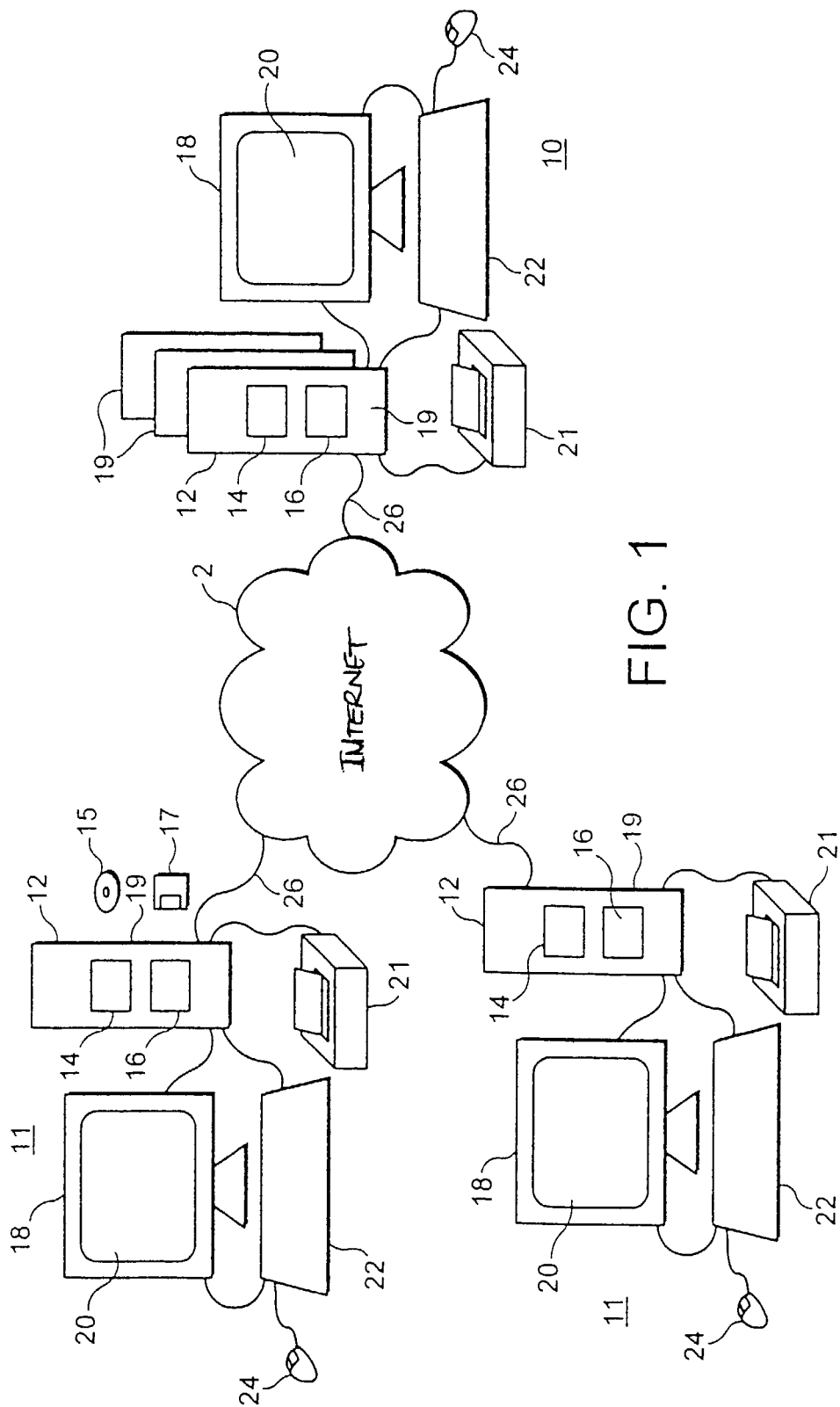
FIG. 1 shows a schematic representation of a network of computer systems.

Referring now to FIG. 1, there is illustrated a schematic representation of a network of computer systems, such as the Internet, comprising a network device, here a server computer system 10, and user devices, here client computer systems 11. Both the server computer system 10 and the client computer systems 11 comprise similar components, for example a system unit 12, a display device 18 with a display screen 20, and user input devices, including a keyboard 22 and a mouse 24. A printer 21 is also connected to the system. Each system unit 12 comprises media drives, including an optical disk drive 14, a floppy disk drive 16 and an internal hard disk drive, not explicitly shown in FIG. 1. A CD-ROM 15 and a floppy disk 17 are also illustrated. Additionally, server computer system 10 comprises high capacity storage media, such as further magnetic hard disks 19, for example. The computer system shown in FIG. 1 is also connected through connections 26 to a network 2, which in the illustrated embodiment is the Internet but may be a local or wide area dedicated or private network, for example. The network may provide secure communications through the connections 26.

A computer program for implementing various functions or conveying various information may be supplied on media such as one or more CD-ROMs and/or floppy disks and then stored on a hard disk, for example. A program implementable by a computer system may also be supplied on a telecommunications medium, for example over a telecommunications network and/or the Internet, and embodied as an electronic signal. For a client computer system 11 operating as a mobile terminal over a radio telephone network, the telecommunications medium may be a radio frequency carrier wave carrying suitably encoded signals representing the computer program and data or information. Optionally, the carrier wave may be an optical carrier wave for an optical fibre link or any other suitable carrier medium for a land line link telecommunication system.

Figure 2:
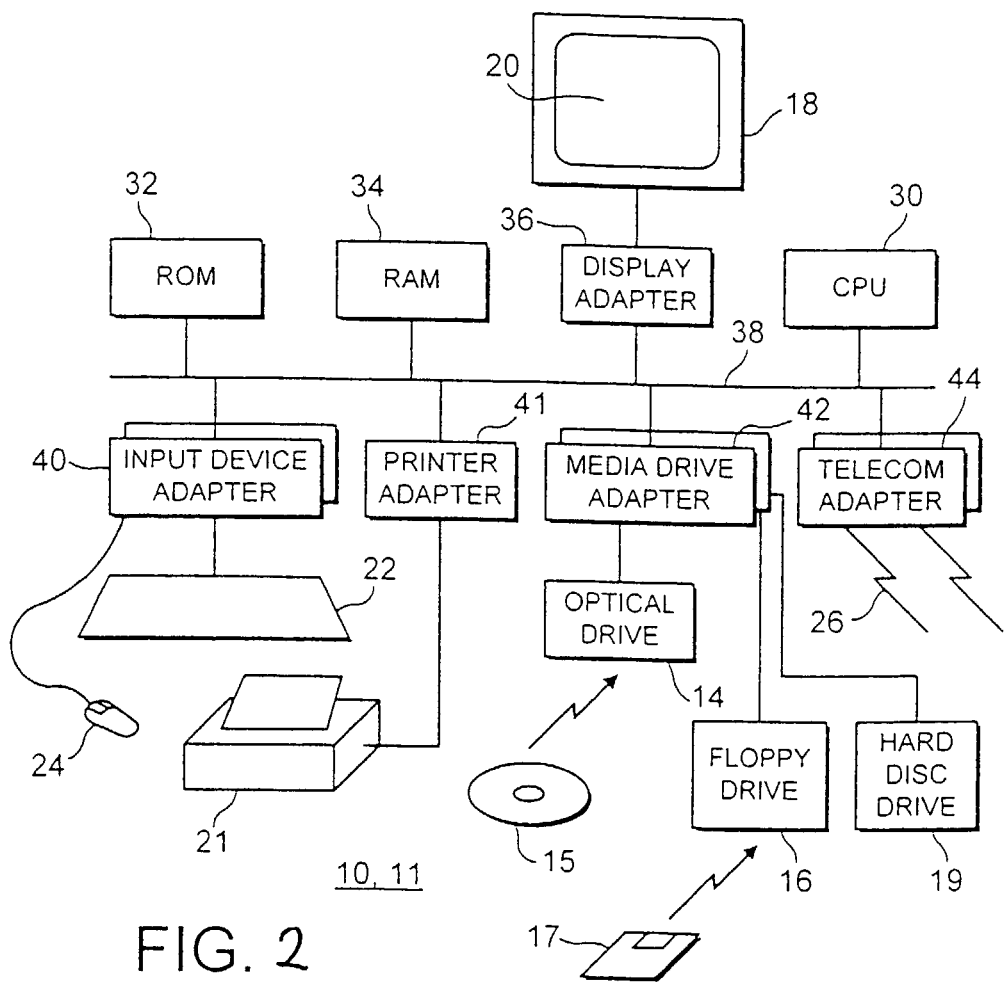
FIG. 2 shows a schematic representation of a computer system.

Referring now to FIG. 2, there is shown a schematic and simplified representation of an illustrative implementation of a data processing apparatus in the form of a computer system such as that referred to with reference to FIG. 1. As shown in FIG. 2, the computer system comprises various data processing resources such as a processor (CPU) 30 coupled to a bus structure 38. Also connected to the bus structure 38 are further data processing resources such as read only memory 32 and random access memory 34. A display adapter 36 connects a display device 18 to the bus structure 38. One or more user-input device adapters 40 connect the user-input devices, including the keyboard 22 and mouse 24 to the bus structure 38. An adapter 41 for the connection of the printer 21 may also be provided. One or more media drive adapters 42 can be provided for connecting the media drives, for example the optical disk drive 14, the floppy disk drive 16 and hard disk drive 19, to the bus structure 38. One or more telecommunications adapters 44 can be provided thereby providing processing resource interface means for connecting the computer system to one or more networks or to other computer systems. The communications adapters 44 could include a local area network adapter, a modem and/or ISDN terminal adapter, or serial or parallel port adapter etc, as required.

It will be appreciated that FIG. 2 is a schematic representation of one possible implementation of a computer system, suitable for one or more of a server computer system 10 and a client computer system 11. It will be appreciated, from the following description of embodiments of the present invention, that the computer system in which the invention could be implemented may take many forms. For example, rather than the server computer system 10 comprising a display device 18 and printer 21, it may be merely necessary for the server computer system 10 to comprise a processing unit, and be accessible by client computer systems 11. The client computer may also be a non-PC type of computer which is Internet- or network-compatible, for example a Web TV, or set-top box for a domestic TV capable of providing access to a computer network such as the Internet.

Optionally, the client computer may be in the form of a wireless personal digital assistant (PDA), wireless application protocol (WAP) enabled telephone or a multimedia terminal.

Each computer system 10, 11 has a unique address within the Internet and within the terminology of the World Wide Web (WWW) these addresses are known as Uniform Resource Locators (URLs). Additionally, other resources within the WWW may also have a unique address or URL. A resource may comprise not only different types of processing or storage apparatus, but also one or more of different types of information, for example text, graphics, audio, video etc and such resources may therefore be referred to as hypermedia documents or resources.

WWW software is based on client-server architecture, and may be utilised as such and within peer-to-peer communications. A web client, for example a browser, is a computer program which can send requests to a web server. These requests may be requests for information or requests to initiate certain tasks, such as transaction processes, for example. Typically, the information is presented through the browser on screen 20 of client computer system 11. Often, for reasons of security, the requests and any responses to the requests are dispatched between a client computer system 11 and a server computer system 10 over a secure link, such as one created using a secure sockets layer (SSL) protocol, for example. A web server is a program which sends responses to requests from a client. The web server resides on a server computer system 10. The response received by the client is stored by a client computer system 11, typically on hard disc drive 19. The client program typically resides on hard disc drive 19 of the client computer system 11 and is operable to configure client computer system 11 to interface with the Internet and WWW.

Requests and responses between client computer systems 11 and server computer systems 10 may be transferred across a network, such as the Internet, using an appropriate protocol, such as Hypertext Transfer Protocol (HTTP) for transmitting HTML pages. The protocol may support the provision of information entities which are usually generated by the server computer system 10 and communicated to the client computer system 11. An information entity is typically stored in the memory of the client computer system 11 and communicated back to the server computer system 10, normally together with a client request. The server computer system 10 may use the information entity to identify a user and retrieve data from a locally stored record of previously submitted information associated with the user. This enables such information, which could be address details for example, to be re-used without the user having to re-submit it. One example of such an information entity is a "cookie" in HTML.

A client computer system such as client computer system 11 is an example of a user device, and a browser is an example of a user interface. A server computer system such as server computer system 10 is an example of a network device, and a web server is an example of a network interface. Embodiments of the invention are implemented on the user device and the network device and these embodiments will be described with reference to the example of client computer system 11 and server computer system 10. In a particular example the client computer system 11 runs a web browser, such as Netscape Communicator, and the server computer system 10 runs a web server. An example of a web server is called the iPlanet Web Server 6.0, marketed by iPlanet, a Sun-Netscape Alliance.

Figure 3:
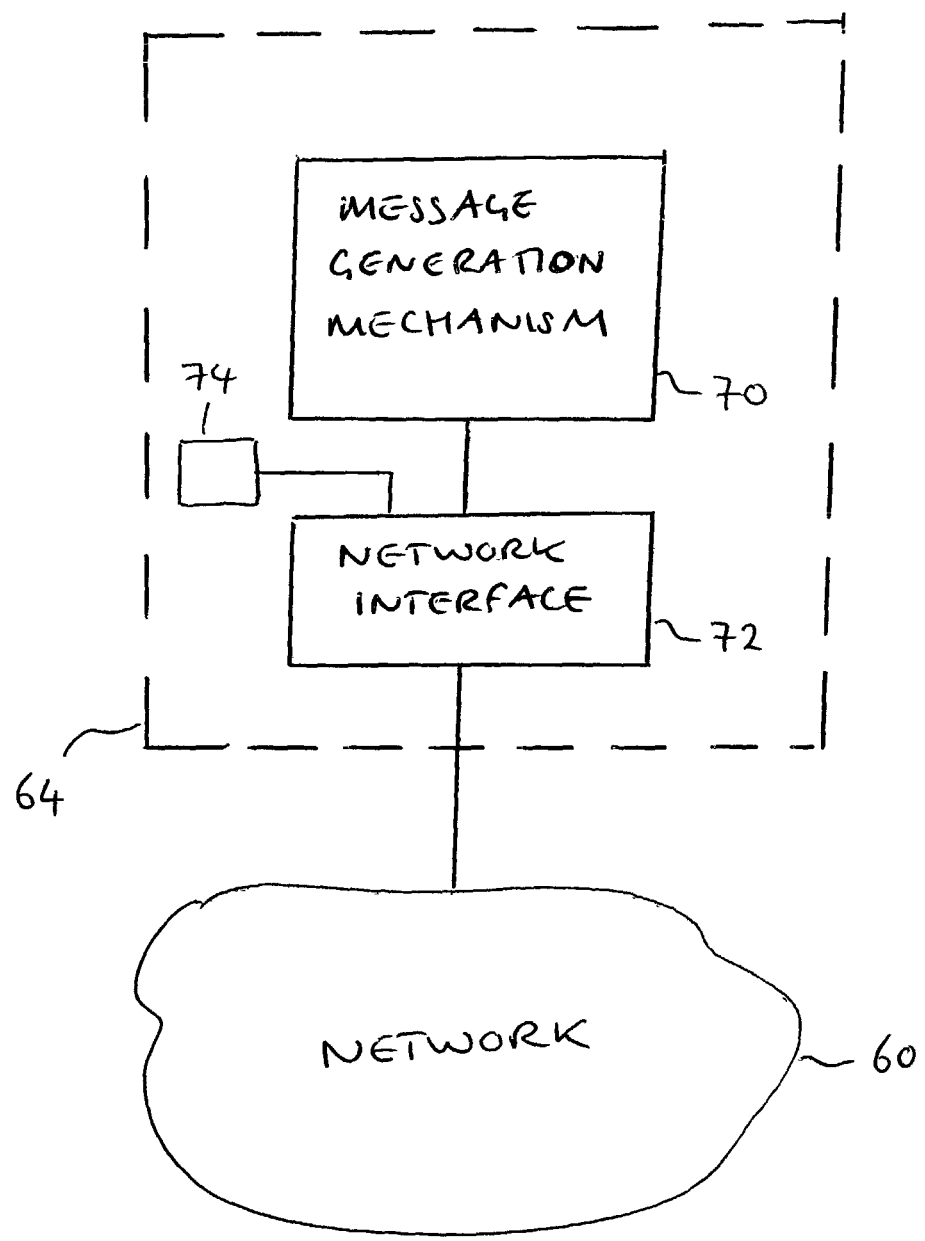
FIG. 3 is a schematic representation of a network device including a message generation mechanism, an authentication mechanism and a network interface.

FIG. 3 illustrates the relationship of software components operating on the hardware of a network device 64 connected to a network 60, for example server computer system 11 connected to the Internet 2. A network interface 72 and a message generation mechanism 70 are configured to operate on the hardware of the network device 64. Also configured to operate on the hardware of the network device 64 is an authentication mechanism 74. Suitably, the network interface 72, message generation mechanism 70 and authentication mechanism 74 can be formed by software components stored in memory of the network device 64 and operable to control the processor of the network device 64. The network interface 72 comprises a mechanism to provide messages across network 60 in response to user requests from a user device such as user device 62, for example. The messages, in one example HTML messages, are for conveying information to a user device for presenting the information to a user via a user interface. The message generation mechanism 70 is configured to generate a message which includes data for signing by the user device. The signed data is subsequently used by network device 64 to authenticate the identity of the user and authorise the user via a look-up table, for example.

Figure 4:
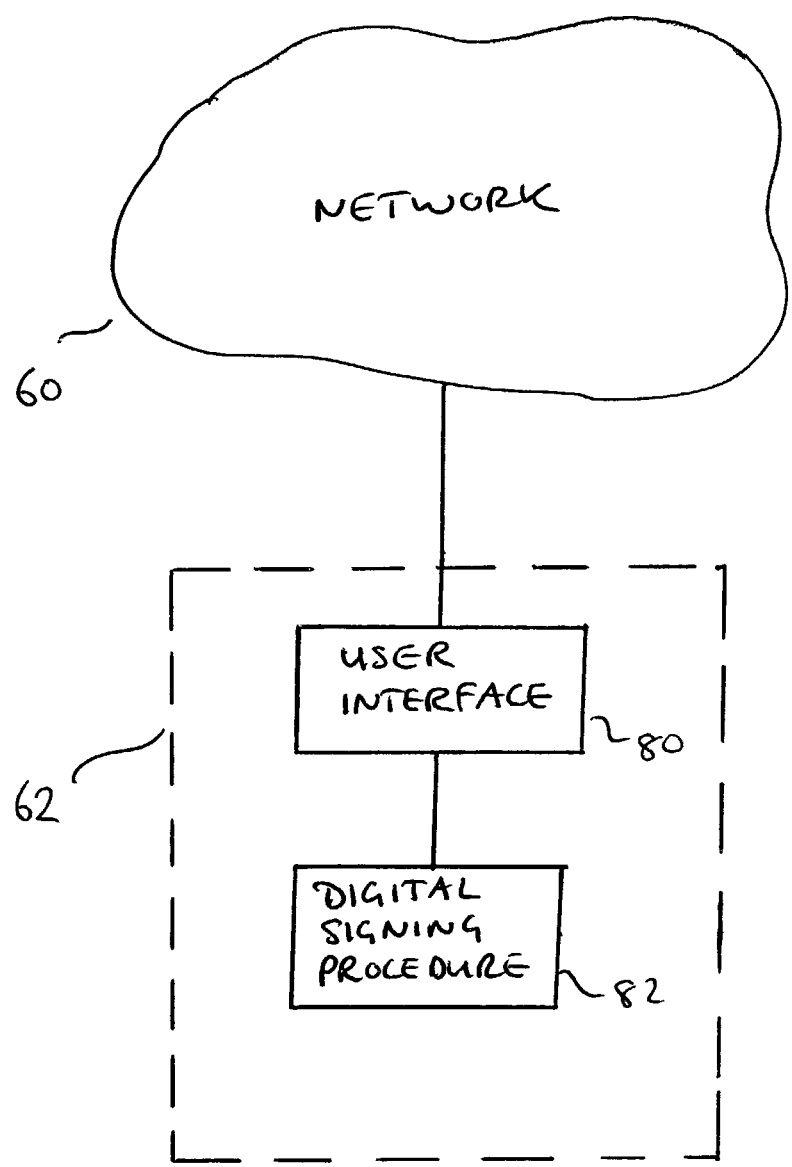
FIG. 4 is a schematic representation of a user device.

FIG. 4 illustrates the relationship of software components operating on the hardware of a user device 62 connected to network 60, such as client computer 10 connected to the Internet 2. A user interface 80 and a digital signing procedure 82 are configured to operate on the hardware of the user device 62. Suitably, the user interface 80 and digital signing procedure 82 can be formed by separate software components stored in memory of the user device 62 and operable to control the processor of user device 62. The user interface 80 comprises a mechanism to send requests to and receive messages from network device 64 across network 60. The user interface also comprises a mechanism for presenting or displaying information contained in the messages to a user, for example through a display screen of the user device 62. The digital signing procedure 82 comprises a mechanism to digitally sign data with an authentication token representing the user, for example a private key stored in the memory of user device 62.

Referring back to FIG. 3, in a particular embodiment, network interface 72 and message generation mechanism 70 are configured to perform the operational steps shown in FIGS. 5, 6, 8 and 9 of the accompanying drawings. The operation of such an embodiment will now be described with reference to these Figures.

Figure 5:
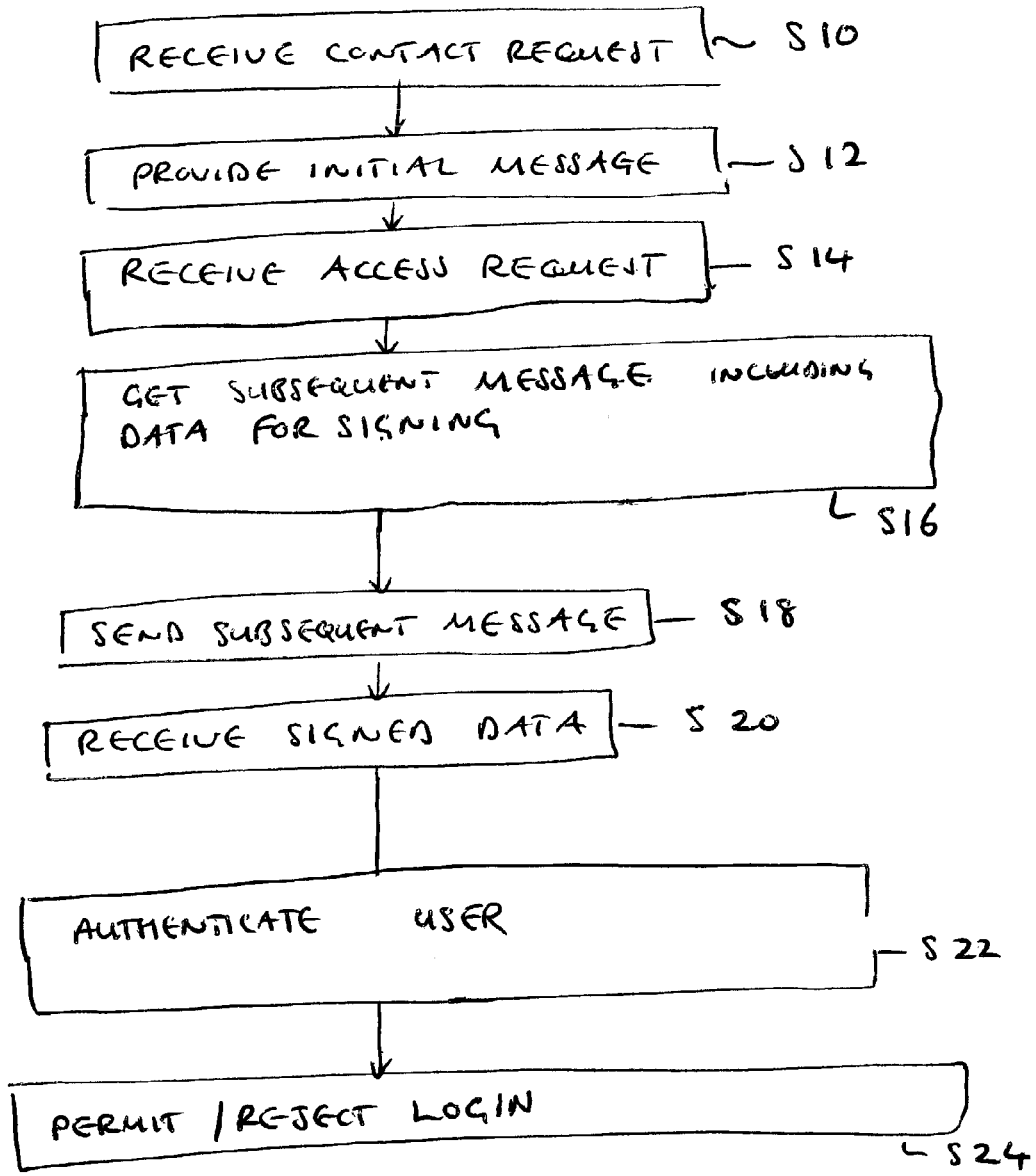
FIG. 5 is a flow diagram illustrating an example of operation of a network interface in accordance with an embodiment of an aspect of the invention.

FIG. 5 shows the operational steps of the network interface 72. As shown in FIG. 5, a contact request from a user is received at step S10. In response, at step S12, an initial message is sent to the user device 62. The initial message is configured to enable the user to make an access request. The access request is received at step S14.

At step S16 the network interface gets or generates a subsequent, or modified, message that includes data for signing by the user device and that also includes instructions for implementation by the user device. An example of operational steps suitable for performing step S16 will be given later with reference to FIG. 6. As will be described, these steps include a step which stores the data for use in authentication step S22.

The subsequent or modified message containing information for display to the user and the data for signing is sent to the user device at step S18.

The data, having been signed by the user device, is received at step S20 and the signed data and stored data are used to authenticate the user at step S22. If the authentication is positive, and the user is authorised for access (for example via a simple look-up table), the user is permitted to log-in at step S24. Otherwise log-in is rejected. An example of operational steps suitable for performing step S22 will be given later with reference to FIG. 8.

In a particular example, the network interface is a web server configured to receive Hypertext Transfer Protocol (HTTP) requests and to provide HTML messages or pages in response. Suitably, the contact request is in the form of an HTTP get request, identifying a web page held on the web server and typically input by the user as a URL. The initial message is an HTML message and in this example the access request is in the form of the initial message posted back to the network interface. The subsequent message is also an HTML message and the signed data is received in the subsequent message posted back to the network interface.

Figure 6:
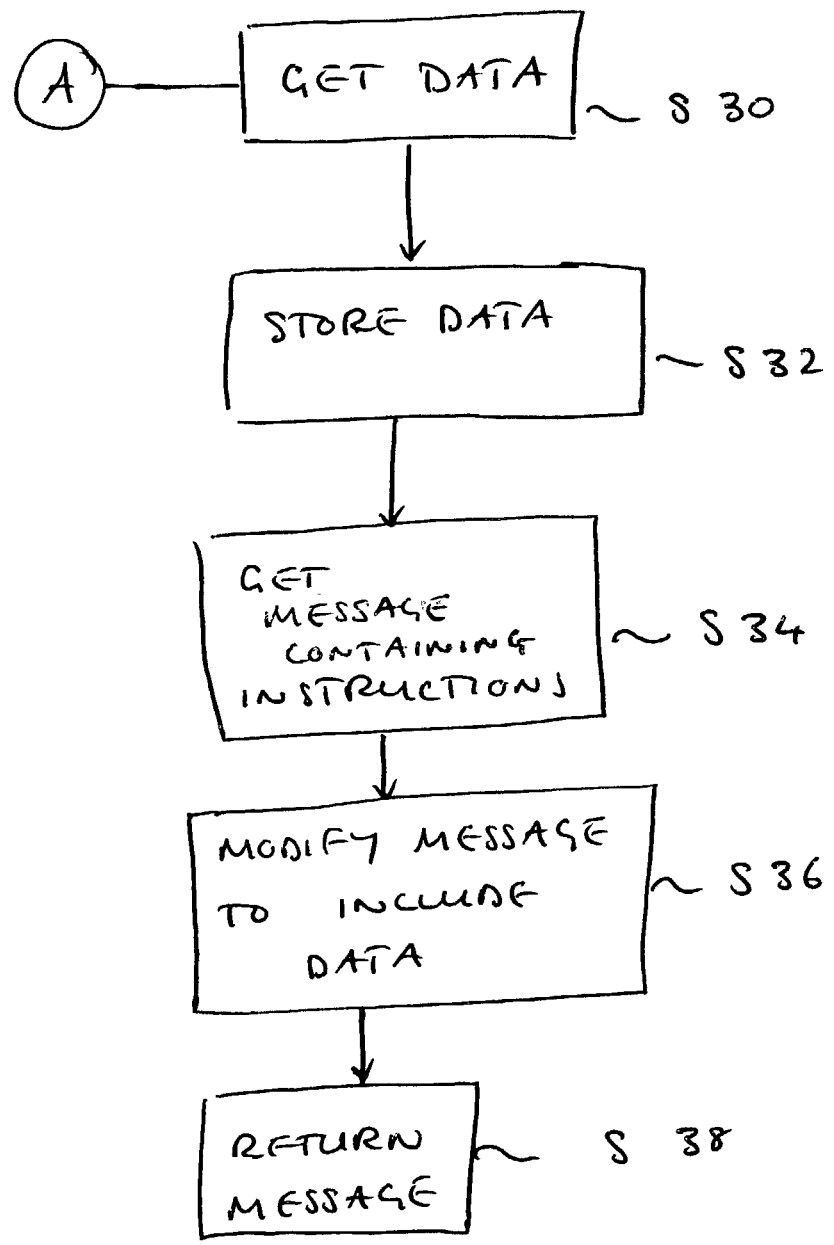
FIG. 6 is a flow diagram illustrating an example of operation of a message generation mechanism in accordance with an embodiment of an aspect of the invention.

In this example, the initial HTML message is a static HTML page and the subsequent message is a dynamic HTML page. The static page contains information which is predefined whereas the dynamic page contains information or data which has been dynamically assembled or generated by the network device. Significantly more processing is required to provide a dynamic page than is required to provide a static page. This arrangement of static and dynamic messages therefore protects against repetition or "denial of service" attacks where a contact request is repeatedly made for the initial message. If the initial message was a dynamic message such a repetition attack would consume significantly more resources on the network device FIG. 6 shows the operational steps of the message generation mechanism 70 which perform the operational step S16 of FIG. 5. At step S16 of FIG. 5, step S30 of the message generation mechanism is called. Referring now to FIG. 6, at step S30 the mechanism 70 gets or generates data for signing and the data is stored at step S32, together with data identifying the user device.

At step S34 the mechanism 70 gets or generates a message that includes instructions for implementation by the user device. The message is modified to include the data for signing at step S36.

The modified message is returned to the network interface 72 at step S38 for sending to the user device at step S18 of FIG. 5.

In the particular example, the message generation mechanism is implemented as a servlet written in Java and the data is secure random data. Secure random data is typically an infinite non-repeating series for all users and can be generated by a secure random data generation function such as the SHA-1/PNG algorithm. The data is stored with data representing the user device by the servlet requesting the web server to store the data in the session which contains the IP address of the user device.

In the example, a stored HTML file is used in Step S34 and an example of a portion of this file is given in FIG. 7. The dashed lines in the example show where other HTML code relating to the format of the page, for example, would be in the complete file. As shown in FIG. 7, the file already contains instructions 90 for implementation by the user device. The HTML file also contains a line of text "REPLACETHIS-STRING" as hidden text using the HTML "hidden" functionality (equivalently implementable using <hidden> </hidden> tags). At step S36 the servlet searches the HTML file for this text and replaces it with the generated data. The generated data is thus hidden and will therefore not be displayed by a browser in a standard viewing mode. The modified HTML file with instructions and generated data is then returned to the web server which in turn sends the modified HTML file, or message, to the user device. The instructions are implemented by the user device 62 as will now be described.

Figure 10:
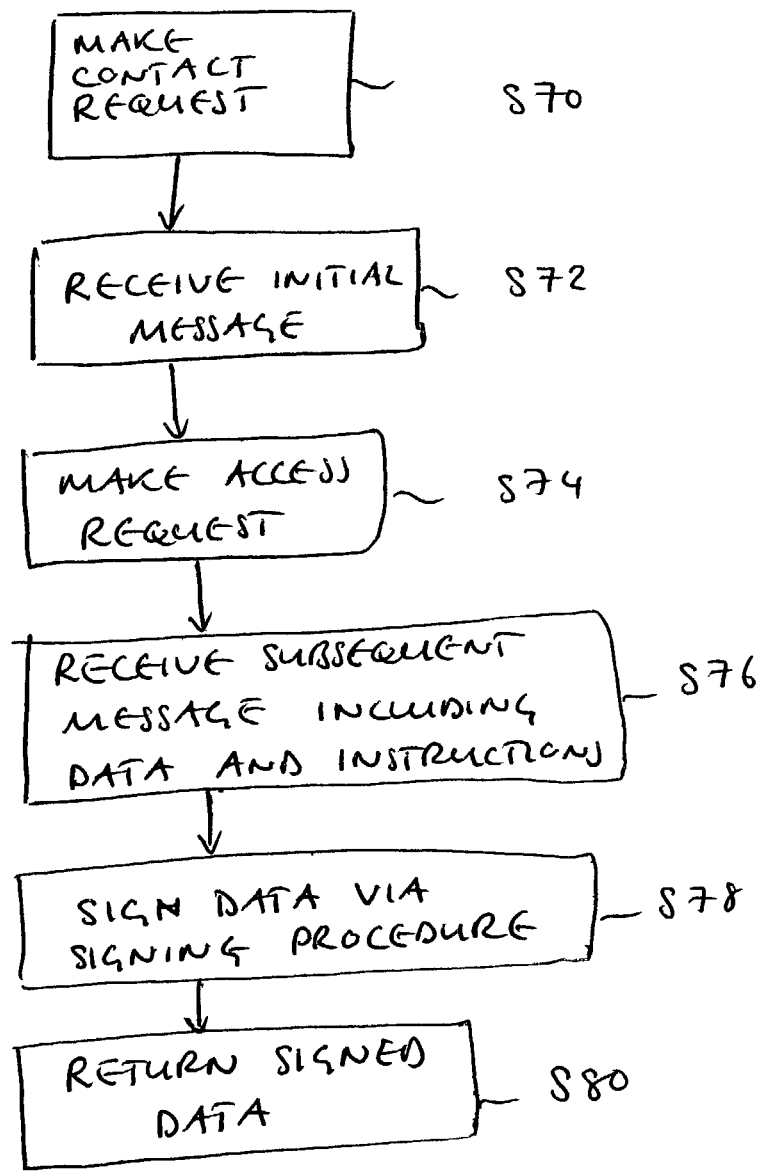
FIG. 10 is a flow diagram illustrating an example of operation of a user device in accordance with an embodiment of an aspect of the invention.

Referring back to FIG. 4, in a particular embodiment user interface 80 and digital signing procedure 82 of user device 62 are configured to perform the operational steps shown in FIG. 10 of the accompanying drawings. The operation of such an embodiment will now be described with reference to FIG. 10.

FIG. 10 shows the operational steps performed at the user device. As shown, at step S70 a user makes or sends a contact request to the network device 64.

At step S72, the user device receives the initial message. The initial message enables the user to make an access request, and at step S74 the user sends an access request to the network device 64.

At step S76, the user device receives the modified message including data for signing and instructions implementable by the user device. The instructions configure the user device to automatically initiate the digital signing procedure and automatically return the signed data.

Consequently, at step S78, the data is signed with an authentication token using digital signing procedure 82. The signed data is returned to the network device at step S80.

In the present example, the user interface 80 is a web browser and the digital signing procedure 82 is part of a software application for a smart card reader such the Gemplus GemPC4100 smart card reader. The authentication token is a private key stored on a smart card, such as the GemSAFE IS 16000 Smart Card, accessible via the smart card reader. Also stored on the smart card is certificate data comprising a certificate chain and the user's digital certificate which comprises the user's public key, the username, a serial number and the issuer name. The serial number and issuer name uniquely identify the certificate.

As has already been described, in the example the contact request is an HTTP request and the message is an HTML message. The access request is made by posting the page back to the network device. The modified, or subsequent, message is also an HTML message with the data obstructed from presentation to the user in a standard viewing mode by using HTML hidden functionality or tags, as described with reference to FIG. 7.

Referring back to FIG. 7, in the present example the instructions are written in JavaScript and use the JavaScript OnLoad feature, marked as Line L14. When the HTML page is received and loaded by the user device browser, the "doSign( )" function is initiated by line L14 of the JavaScript. Line L10 of the function invokes an applet stored on the server. The applet (not shown) is a signed applet which means that it has access permissions that enable it to initiate the digital signing procedure directly without the need for user interaction. The applet initiates the smart card digital signing procedure to sign the data. The data is signed by the digital signing procedure and the signed data is returned to the applet together with the certificate data held on the smart card. The applet inserts the signed data and certificate data into the HTML page which is then posted back to the network device. Line L12 of the JavaScript, posts the HTML page back to the network device. In the present example, the signed data and certificate data are in the Base 64 encoded PKCS#7 format.

Figure 8:
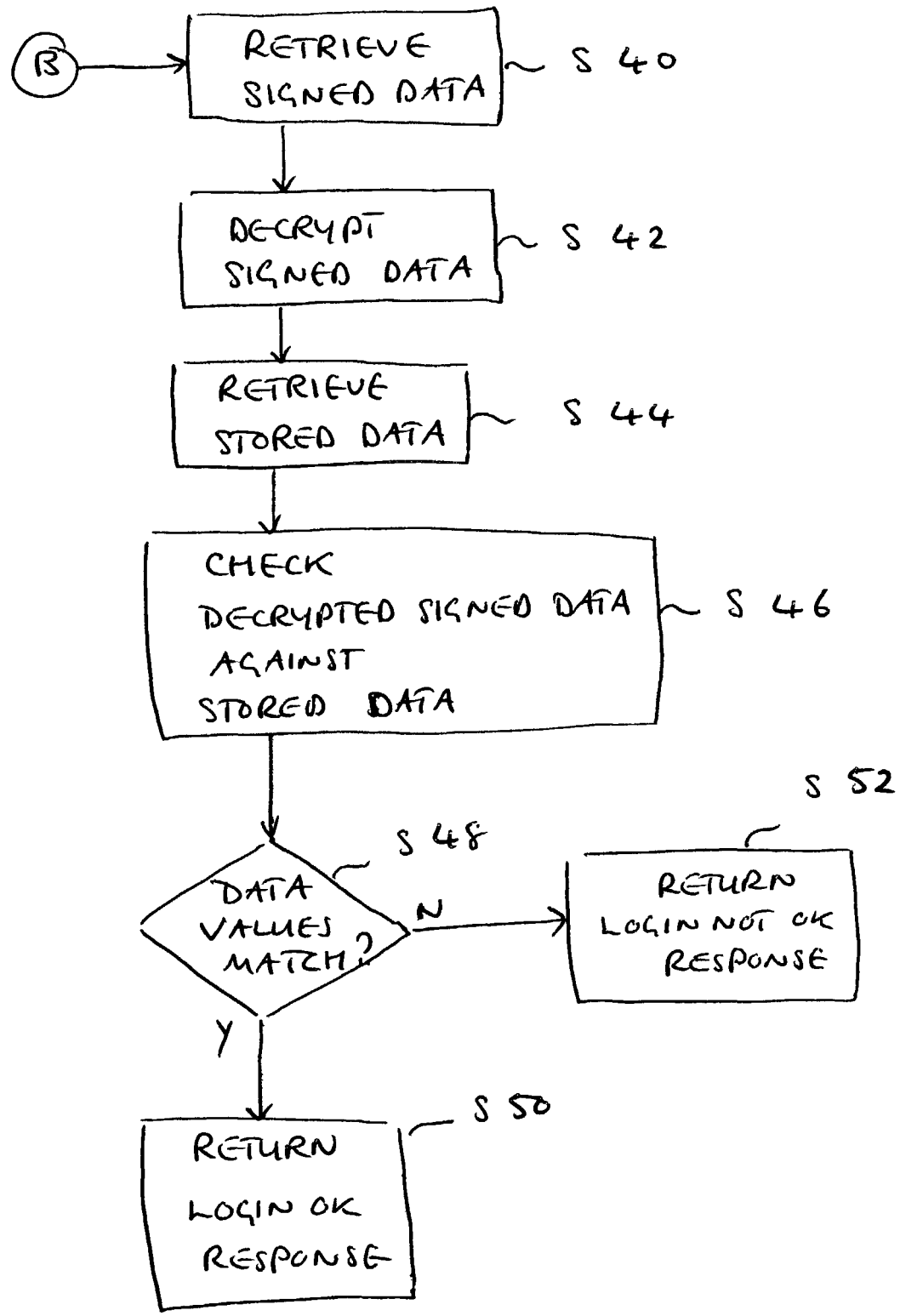
FIG. 8 is a flow diagram illustrating an example of further operation of a message generation mechanism in accordance with an embodiment of an aspect of the invention.

FIG. 8 shows the operational steps of the message generation mechanism 70 which perform the authentication step S22 of FIG. 5 after the signed data has been received at the network device at step S20. At step S22 of FIG. 5, step S40 of the message generation mechanism is called.

Referring now to FIG. 8, at step S40 the mechanism 70 retrieves the signed data returned from the user device. The signed data is then decrypted at step S42. At step S44 the data stored in step S32 (FIG. 6) is retrieved.

At steps S46 and S48, the decrypted signed data is checked against the retrieved stored data. If the data values match, a LOGIN OK response is returned to the network interface at step S50. Otherwise, at step S52 a LOGIN NOT OK response is returned to the user interface.

In the example, the stored data is retrieved from the session. The user's digital certificate is extracted from PKCS#7, the signed data is extracted from PKCS#7 and the signed data is decrypted using the user's public key found in the certificate. The status of the certificate chain may also be checked using a certificate status check. In addition, a supplementary check may be made in a local database that the user's certificate is still valid.

Referring back to FIG. 5, it will now be appreciated that in a particular embodiment the network interface receives a message at step S14 and at step S20. As described, the message received at step S14 does not contain signed data whereas the message received at step S20 does contain signed data. Steps S14 and S20 are followed by steps S16 and S22 respectively which are performed by the message generation mechanism. Suitably, at these steps the message is passed to the message generation mechanism.

Figure 9:
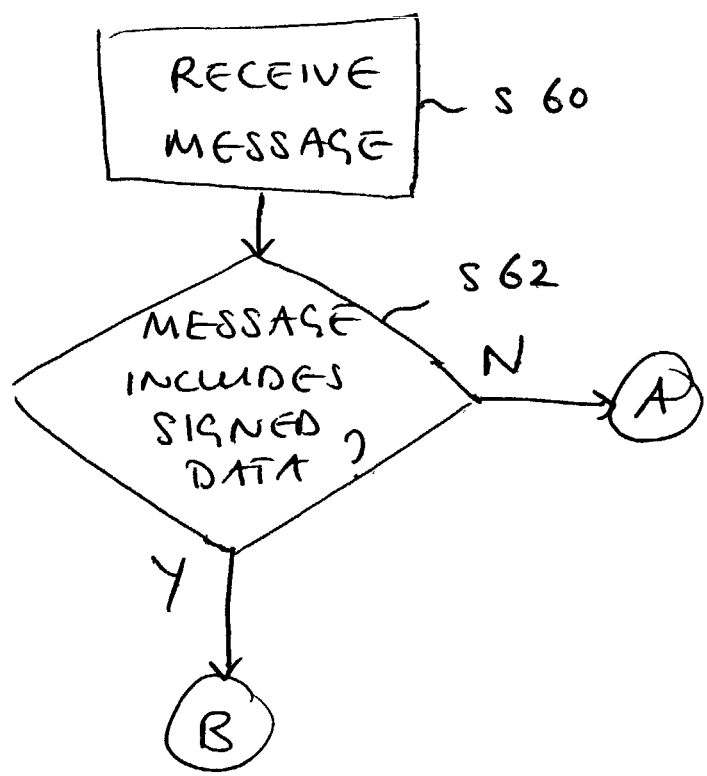
FIG. 9 is a flow diagram illustrating an example of further operation of a message generation mechanism in accordance with an embodiment of an aspect of the invention.

The initial steps performed by the message generation mechanism 70 are shown in FIG. 9. As shown in FIG. 9, at step S60 the mechanism 70 receives the message and at step S62 checks to see if the message contains signed data. If signed data is present the steps of FIG. 8 are performed as indicated by link reference B. Otherwise, if there is no signed data the steps of FIG. 6 are performed as indicated by link reference A.

In the example, the initial message and the modified message are configured so that when they are posted back to the web server the servlet is invoked. This is implemented using the HTTP redirect feature.

FIGS. 11A to 11E show examples of screen shots taken from a user device 62, such as client computer system 11, connected to a smart card reader. In the example the smart card reader is a Gemstar GemPC4100 Reader used with a GemSAFE IS 16000 Smart Card.

Figure 11:
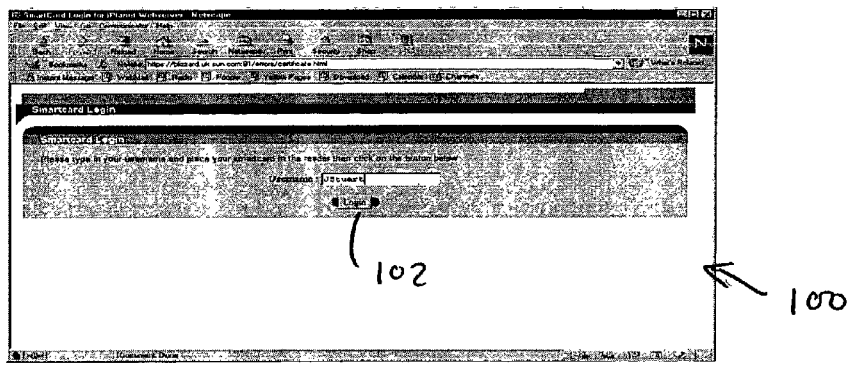
FIGS. 11A to 11E illustrate example screen shots taken from a user device operating in accordance with an embodiment of an aspect of the invention.
Figure 11:
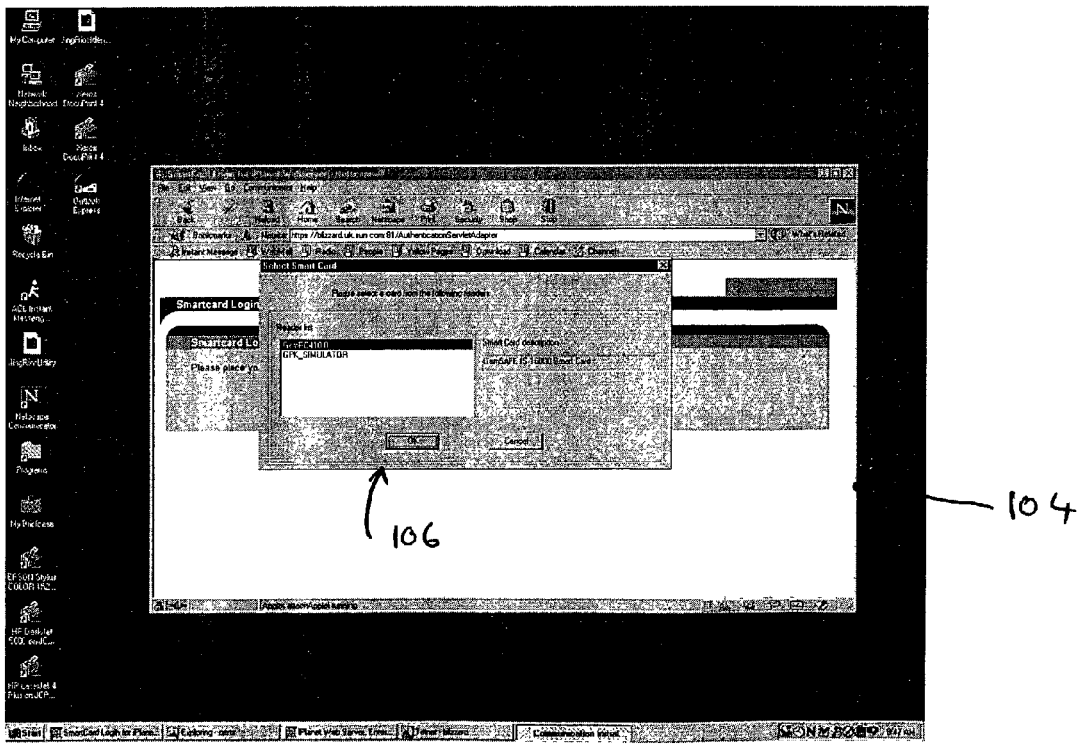

FIG. 11A illustrates an example of a screen shot 100 presenting the information contained in the initial message. The displayed information instructs the user to type in their username and place their smart card in the reader before clicking a login button 102. Clicking login button 102 posts the initial message back to the network device.

A subsequent message 104 is returned to the user device by the network device. A screen shot 104 displaying the information contained in the subsequent message is shown in FIG. 11B and, as can be seen, screen shot 104 looks substantially the same as screen shot 100 (in layout, colour etc.) to maintain the user experience. The instructions in the subsequent message initiate the smart card software interactions and smart card screen 106 is displayed to the user as illustrated in FIG. 11B.

Figure 11C:
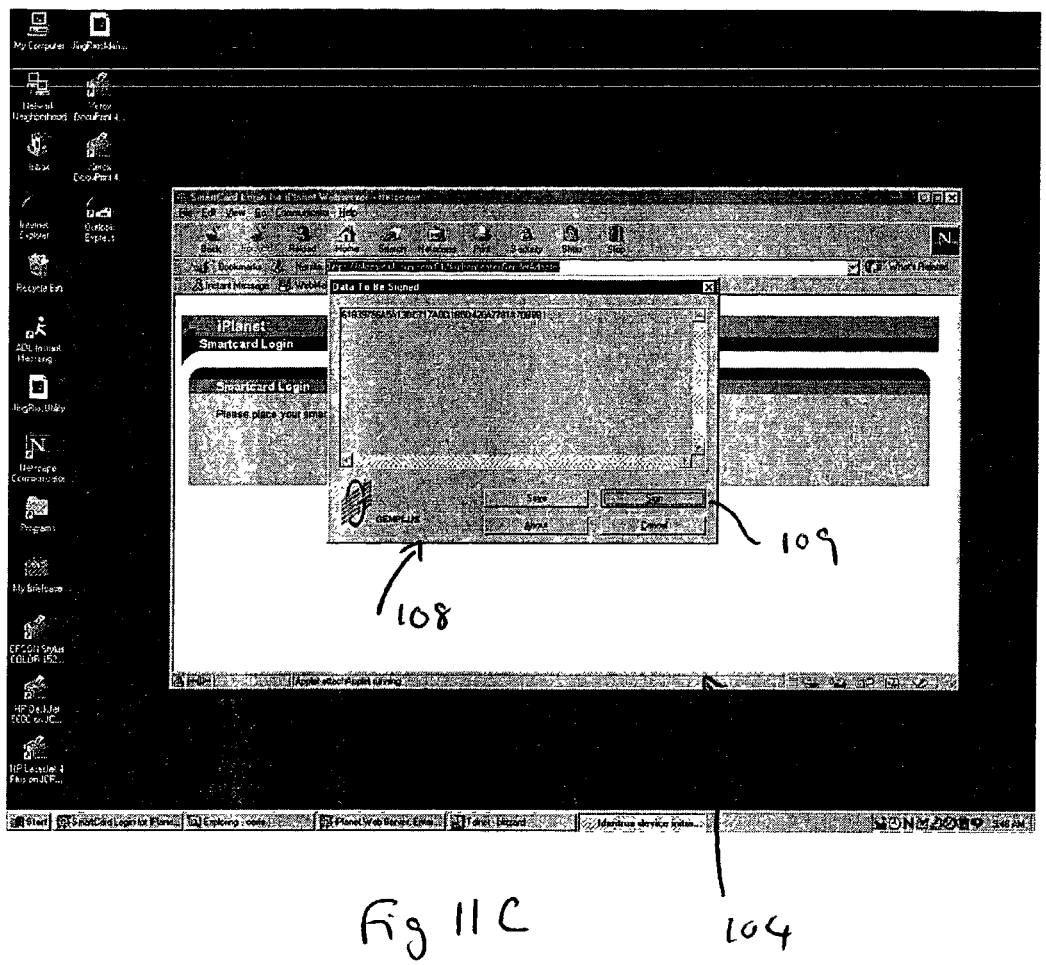

The user selects the correct smart card reader from the list displayed in screen 106. The data to be signed is displayed at this stage through smart card software interaction screen 108 as shown in FIG. 11C. The user clicks the sign button 109 to sign the data.

Figure 11D:
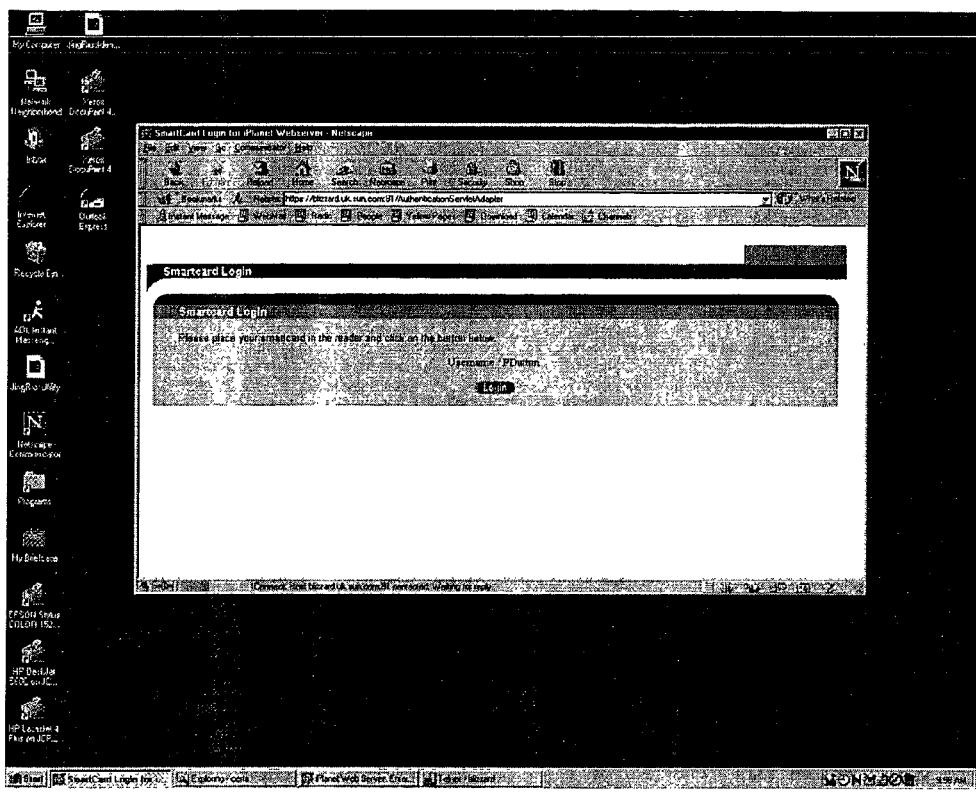

The signed data is then sent automatically to the network device and, as shown in FIG. 11D, screen shot 104 remains displayed while the user device waits for a response from the network device.

Figure 11E:
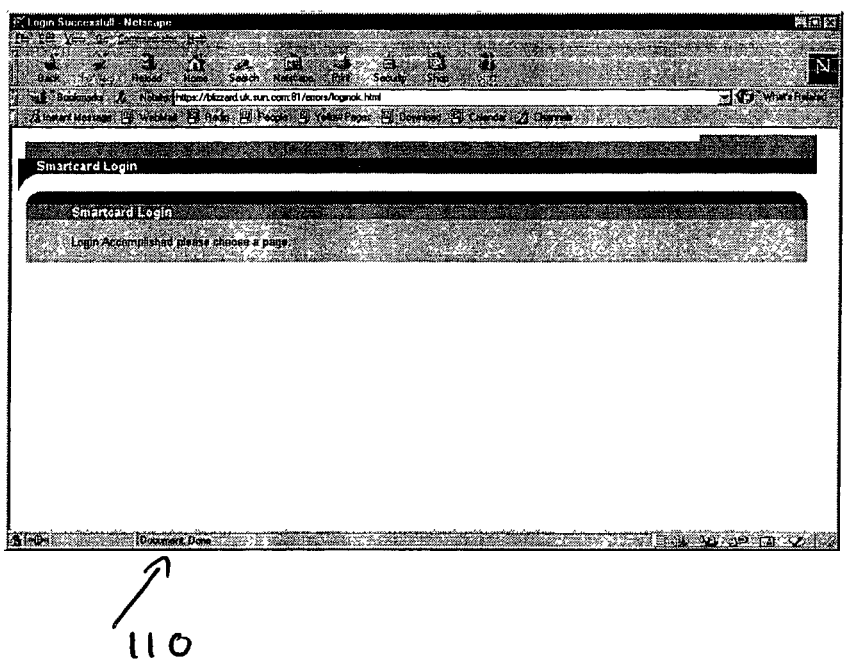

On positive authentication, the network device sends a message allowing the user access to resources on the network device. An example of a screen shot 110 displaying the information contained in the message on the user device is shown in FIG. 11E.

The smart card software interactions shown are interactions created by a particular smartcard manufacturer and may differ between vendors.

It will be appreciated that without the instructions in the message a user would have to carry out several steps to sign and return the data. For example, the data could be presented to the user as part of the message with a prompt such as "Please digitally sign this data and paste the signed data into the field below, then click on the submit button". The user would have to copy the data across into the digital signing procedure and initiate the procedure before transferring the signed data into the displayed message and clicking the button to post the message back to the network device. Particular embodiments in accordance with an aspect of the present invention obviate the need for performing such steps, thereby improving the user experience.

The description so far has been concerned with authentication, i.e. checking that the user is who they purport to be. After authentication, an authorisation check is normally performed i.e. a check that a user is permitted access to a resource. In one embodiment a simple authorisation check is performed at step S24 of FIG. 5. The simple authorisation check is performed by network interface 72 which uses a table of usernames and associated authorisation levels to check whether or not a user is authorised for access. In one embodiment the usernames are stored as user groups, for example groups of developers, sales personnel, etc.

To avoid the user having to go through the authentication steps described above each time the user requests a protected resource on the network device, authentication mechanism 74, in accordance with an embodiment of an aspect of the present invention, is provided.

The message generation mechanism 70 performs further operations when implemented with an embodiment of authentication mechanism 74. Referring back to FIG. 8, at step S50 the message generation mechanism 70 generates an authentication entity 120 comprising entity data 122 and a signed version of the entity data 124, signed by a network device key which is a secure key, not generally available to users. The network device key may be a secret key or a PKI private key. The private key may have a corresponding public key held on a network device certificate.

Figure 12:
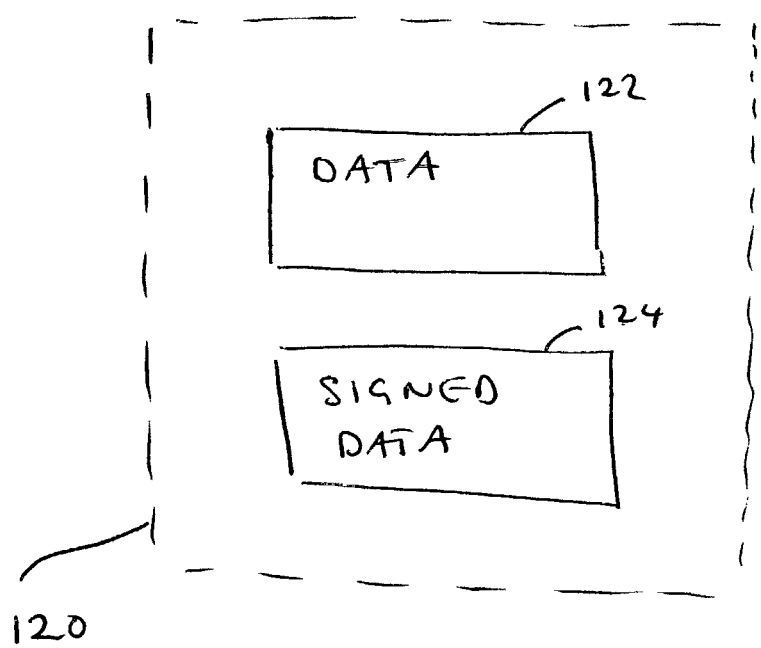
FIG. 12 illustrates an embodiment of an authentication entity.

The authentication entity 120 comprising entity data 122 and signed entity data 124 is illustrated in FIG. 12. In one embodiment the authentication entity 120 is a "cookie", generated by a cookie generator.

The entity data 122 comprises a user identifier, identifying the authenticated user. In particular embodiments the entity data 122 also comprises an expiry identifier, identifying when the authentication entity 120 expires; a user certificate identifier, identifying the user certificate; and/or a network device key identifier, identifying the network device key.

In a particular embodiment the requests and responses between the user device and network device are communicated through a secure link to ensure that the authentication entity 120 can not be intercepted during transmission and used by a third party. In such an embodiment, the entity data 122 may also comprise a secure link identifier, identifying the secure link between the user device and the network device At step S50 of FIG. 8, the message generation mechanism also instructs the network interface 72 to send the authentication entity 120 to the user device 62. The authentication entity 120 is stored locally on the user device and is transmitted to the network device with each request that the user device sends to the network device. This storage and transmission of the authentication entity 120 is typically implemented in accordance with the protocol that the network device and user device use to communicate with one another, for example in the way cookies are stored and transmitted in HTTP.

Figure 13:
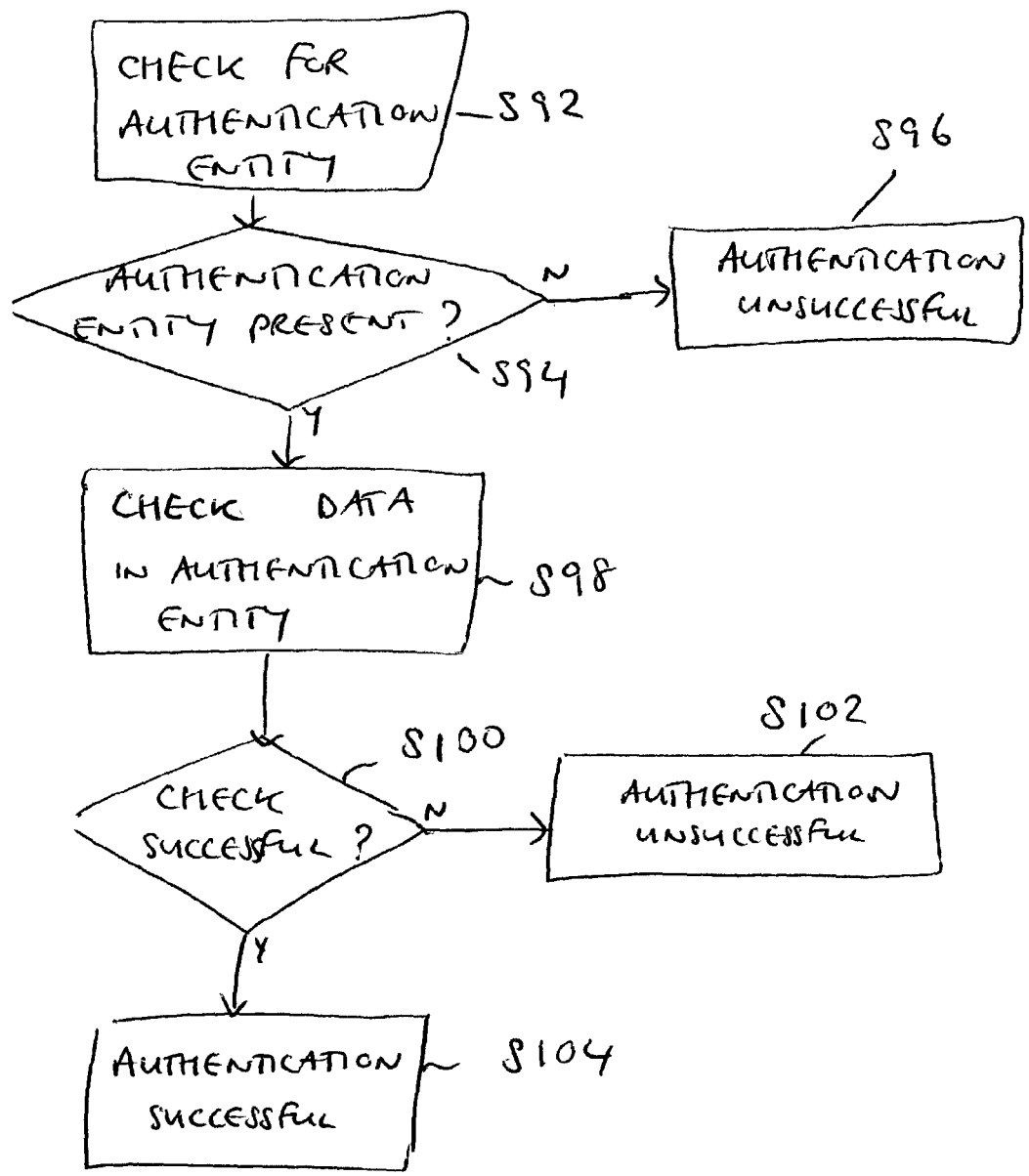
FIG. 13 is a flow diagram illustrating an example of the operation of an authentication mechanism in accordance with an embodiment of an aspect of the invention.
Figure 14:
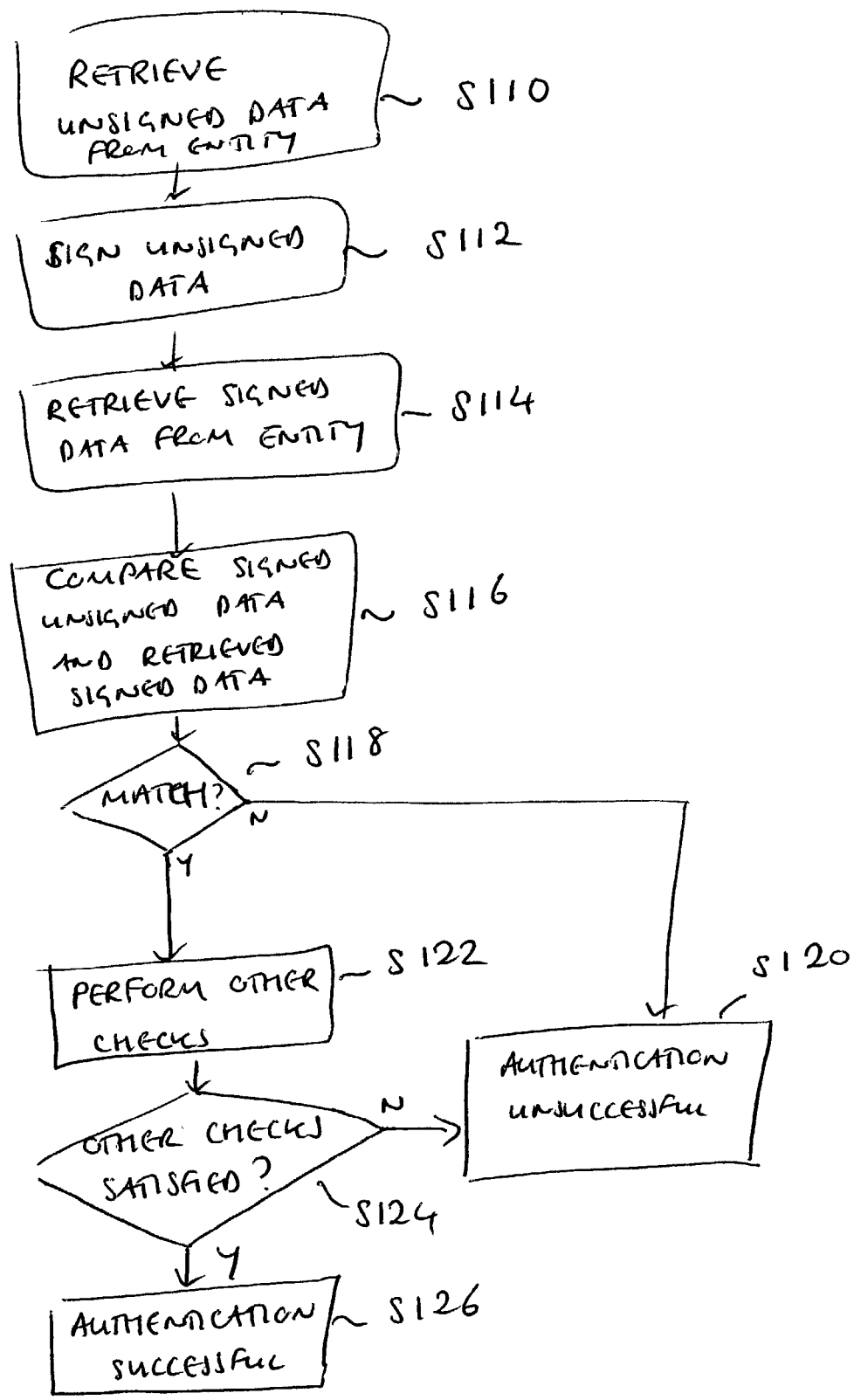
FIG. 14 is a flow diagram illustrating an example of further operation of an authentication mechanism in accordance with an embodiment of an aspect of the invention.

Referring back to FIG. 3, in a particular embodiment authentication mechanism 74 is configured to perform the operational steps shown in FIGS. 13 and 14 of the accompanying drawings. The operation of such an embodiment will now be described with reference to these Figures.

FIG. 13 shows the operational steps of the authentication mechanism 74. The authentication mechanism 74 is called by the network interface 72 on receiving a contact or other user request at step S10 of FIG. 5. As shown in FIG. 13, the authentication mechanism 74 checks at steps S92 and S94 to see if an authentication entity 120 has been transmitted with the request.

If there is no authentication entity 120, as would be the case for a first contact request, then the authentication mechanism 74 outputs a message to the network interface at step S96 indicating that authentication through the authentication mechanism 74 was unsuccessful. The network interface then goes on to provide the initial message at step S12 of FIG. 5 and authentication proceeds as described with reference to this Figure.

However, if an authentication entity 120 has been transmitted with the request, the entity data 122 in the authentication entity 120 is checked against the signed entity data 124 in the authentication entity 120 at step S98 of FIG. 13. The check is described in more detail below and, if the check is successful, then the authentication mechanism 74 outputs a message at step S104 indicating that the authentication is successful, that is to say the user is positively authenticated. In one embodiment this is done by the mechanism 74 outputting the username of the user to the network interface 72 which can then perform the authorisation check on the user name before granting or refusing access to the user.

If the check at step S100 is unsuccessful, then the authentication mechanism 74 outputs a message at step S96 indicating that authentication through the mechanism is unsuccessful. The network interface then goes on to provide the initial message at step S12 of FIG. 5 and authentication proceeds as described with reference to this Figure.

The checking of data performed through steps S98 to S104 will now be described in more detail with reference to FIG. 14 for an embodiment of the authentication mechanism 74. As shown in FIG. 14, at step S110 the authentication mechanism 74 retrieves the unsigned entity data 122 from the authentication entity 120. At step S112 the mechanism 74 signs this entity data 122 using the network device key. If multiple keys are maintained by the network device, the network device key identifier is used to identify the correct one.

At step S114 the mechanism 74 retrieves the signed entity data 124 from the authentication entity 120. This is the signed entity data 124 created by the message generation mechanism 70 at step S50 of FIG. 8, the message generation mechanism 70 having authenticated the user via steps S40 to S50.

The signed unsigned entity data 122 of step S112 and the signed entity data 124 of step S114 are compared at steps S116 and S118. These values should match if the authentication entity 120 was created by the message generation mechanism 70 and has not been tampered with. In other words, this means that the user has been positively authenticated earlier by the message generation mechanism 70.

If the values match, other checks may be performed at steps S122 and S124. These checks include using the expiry identifier to check that the authentication entity 120 is still valid and/or using the certificate identifier to double check the identity of the user, for example via a local database. Additionally or optionally, the secure link identifier can be used as an additional check to check that the same secure link between user device and network device is being used.

If all of the other checks are satisfied, the authentication is successful as shown as step S126 and the authentication mechanism 74 outputs a message to the network interface 72 indicating that the authentication is successful. The user is then allowed access to the requested resource on the network device without having to go through the authentication steps. It will be appreciated that authentication mechanism 74 operates and authenticates the user with reduced user interaction or interruption to the user experience.

If the data does not match at step S118, indicating possible tampering with the data, or if the other checks are not satisfied, for example the authentication entity 120 has expired, then the authentication is unsuccessful as shown at step S120. A message indicating unsuccessful authentication by the authentication mechanism 74 is output to the network interface 72. The network interface 72 then provides the initial message at step S12 of FIG. 5 and authentication proceeds as described with reference to this Figure.

In a particular example the authentication entity 120 is an HTTP cookie and the authentication mechanism 74 is written in the "C" programming language. The user identifier is a local username recognised by the network device and the expiry indicator is a timestamp in Unix Epoch recording the time when the cookie was generated. The user certificate identifier comprises the username, the issuer name and the serial number, all originally taken from the user smart card. The network device key identifier is a certificate identifier comprising the issuer name and the serial number of the certificate corresponding to the network device key (i.e. the certificate holds the public key of a public/private key pair and the network device key is the private key). The secure link identifier also comprises an issuer number and a serial number. The secure link identifier identifies the SSL client certificate used to establish the secure link.

In the example the entity data 122 and signed entity data 124 are hex-encoded and the data fields containing the username, timestamp, etc. are separated by a "!" character.

This encoding and separation character are used so that the characters do not confuse the HTTP parser.

In the example, the authentication mechanism 74 is configured to accept the cookies as being valid for a set time period, for example half an hour. In step S122, the timestamp is read from the cookie and compared against the present time to see if the cookie is valid. If the user logs out and logs back in again during the set time period, access is therefore allowed.

Also, in the example the signed entity data 124, rather than being simply signed by the network device key, is processed through a mathematical "hash" function to compress the size of the signed entity data 124. It will be appreciated that in such an embodiment, the checks of steps S110 to S118 must be performed. However, in embodiments where a hash function is not used, as an alternative the signed entity data 124 can be decrypted using the public key of the network device certificate and this can be checked against the unsigned entity data 122.

It should be appreciated that it is not necessary to implement message generation mechanism 70 and authentication mechanism 74 together. Each mechanism could be implemented with other equivalents of the other mechanism. That is to say, message generation mechanism 70 could be implemented with a look-up table combined with URL encoding or a standard cookie. Similarly, authentication mechanism 74 could be implemented with a simple mechanism to create the authentication entity and a simple authentication procedure using usernames and passwords.

Insofar as embodiments of the invention described above are implementable, at least in part, using a software-controlled programmable processing device such as a Digital Signal Processor, microprocessor, other processing devices, data processing apparatus or computer system, it will be appreciated that a computer program for configuring a programmable device, apparatus or system to implement the foregoing described methods is envisaged as an aspect of the present invention. The computer program may be embodied as source code and undergo compilation for implementation on a processing device, apparatus or system, or may be embodied as object code, for example. The skilled person would readily understand that the term computer in its most general sense encompasses programmable devices such as referred to above, and data processing apparatus and computer systems.

Suitably, the computer program is stored on a carrier medium in machine or device readable form, for example in solid-state memory, magnetic memory such as disc or tape, optically or magneto-optically readable memory, such as compact disk read-only or read-write memory (CD-ROM, CD-RW), digital versatile disk (DVD) etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

The network interface 72, the message generation mechanism 70 and the authentication mechanism 74 can be provided as separate program products. Optionally, the network interface 72, message generation mechanism 70 and/or the authentication mechanism 74 could be packaged as a single product. Optionally, some of the functionality of one of these components could be performed by another of the components. As an alternative to the provision of software on a carrier medium, the functionality of the present invention could be incorporated in firmware or special-purpose hardware, using, for example, an application specific integrated circuit (ASIC).

It will be appreciated that communications signals embodying aspects of the present invention are communicated over a network between a network device and a user device, typically in the form of requests and responses. The signals can be communicated or transmitted across a transmission medium, such as a telephone line or carrier wave signal. Such a communications signal is also envisaged as an aspect of the present invention Although the invention has been described in relation to the preceding illustrative embodiments, it will be understood by those skilled in the art that the invention is not limited thereto, and that many variations are possible falling within the scope of the invention. For example, methods for performing operations in accordance with any one or combination of the embodiments and aspects described herein are intended to fall within the scope of the invention. As another example, message request and response paths may be implemented using any available mechanisms, including mechanisms using of one or more of: wired, WWW, LAN, Internet, WAN, wireless, optical, satellite, TV, cable, microwave, telephone, cellular etc. The message response and request paths may also be secure links. For example, the message response and request paths can be secure links created over the Internet using Public Key Encryption techniques or as an SSL link.

In particular, it will be appreciated that the invention is not limited to the example protocol and messages described. Indeed, any suitable protocols and forms of messages may be used, depending for instance on the communication protocol operating over the network. The messages may be written in Extensible Hypertext Markup Language (XHTML), Extensible Markup Language (XML), Handheld Device Markup Language (HDML), Wireless Markup Language (WML) and Voice Markup Language (VoxML), for instance. Further, the data for signing may be random or pseudo-random data and the instructions may be written in any suitable language for the protocol, message and user device used. Further still, the digital signing procedure may be any suitable signing procedure and may use an authentication token stored in the memory of the user device or accessible through any suitable media drive.

A particular variation within the scope of the present invention includes a message generation mechanism which dynamically constructs the modified message, by for example dynamic insertion of the instructions, possibly by modifying a received message, such as the initial message.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt the term "comprising", as used throughout the description and claims is not to be construed solely as meaning "consisting only of".

The invention claimed is:

1. A method for providing a message, comprising:
generating, by a computer system, the message for a user device, wherein the message comprises:
authentication data, wherein the authentication data comprises authentication procedure instructions executable for performing digital signing and data to be digitally signed, wherein the authentication data is usable by the user device to perform automatic initiation of an automated authentication signing procedure without user intervention, wherein the automated authentication signing procedure comprises, when executed by the user device, executing the authentication procedure instructions to digitally sign the data to be signed without a user manually digitally signing the data;
information for presentation to the user via the user device; and
return instructions, which, when executed by the user device, effect automatic return of the data after being digitally signed; and
transmitting, by the computer system, the message to the user device over a network.

2. The method of claim 1, wherein the authentication data is not intended for presentation by the user device at any time.

3. The method of claim 1, wherein the authentication data comprises random data or pseudo-random data.

4. The method of claim 1, wherein the authentication data comprises secure random data.

5. The method of claim 1, wherein the message further comprises:
control elements for controlling the presentation of said information to said user.

6. The method of claim 1, wherein the message is written in a markup language.

7. The method of claim 1, wherein the authentication procedure instructions are executable to effect automatic initiation of the automated authentication signing procedure to digitally sign with an authentication token.

8. The method of claim 1, wherein the authentication procedure instructions are written in a script language, and are for execution by the user device.

9. A non-transitory computer accessible memory medium storing program instructions for providing a message, wherein the program instructions are executable to:
generate the message for a user device, wherein the message comprises:
authentication data, wherein the authentication data comprises authentication procedure instructions executable for performing digital signing and data to be digitally signed, wherein the authentication data is usable by the user device to perform automatic initiation of an automated authentication signing procedure without user intervention, wherein the automated authentication signing procedure comprises, when executed by the user device, executing the authentication procedure instructions to digitally sign the data to be signed without a user manually digitally signing the data;
information for presentation to the user via the user device; and
return instructions, which, when executed by the user device, effect automatic return of the data after being digitally signed; and
transmit the message to the user device over a network.

10. The non-transitory computer accessible memory medium of claim 9, wherein the authentication data is not intended for presentation by the user device at any time.

11. The non-transitory computer accessible memory medium of claim 9, wherein the authentication data comprises random data or pseudo-random data.

12. The non-transitory computer accessible memory medium of claim 9, wherein the authentication data comprises secure random data.

13. The non-transitory computer accessible memory medium of claim 9, wherein the message further comprises:
control elements for controlling the presentation of said information to said user.

14. The non-transitory computer accessible memory medium of claim 9, wherein the message is written in a markup language.

15. The non-transitory computer accessible memory medium of claim 9, wherein the authentication procedure instructions are executable to effect automatic initiation of the automated authentication signing procedure to digitally sign with an authentication token.

16. The non-transitory computer accessible memory medium of claim 9, wherein the authentication procedure instructions are written in a script language, and are for execution by the user device.

17. A non-transitory computer accessible memory medium storing program instructions for receiving a message, wherein the program instructions are executable to:
  receive the message over a network, wherein the message comprises:
    authentication data, wherein the authentication data comprises authentication procedure instructions executable for performing digital signing and data to be digitally signed;
    information for presentation to a user; and
    return instructions to effect automatic return of the data after being digitally signed;
  present the information to the user;
  automatically execute the authentication procedure instructions to perform digital signing, wherein said automatically executing digitally signs the data to be digitally signed without the user manually digitally signing the data; and
  transmit the data, after being digitally signed, over the network.

18. The non-transitory computer accessible memory medium of claim 17, wherein the program instructions are not executable to present the authentication data to the user at any time.

19. The non-transitory computer accessible memory medium of claim 17, wherein the authentication data comprises random data or pseudo-random data.

20. The non-transitory computer accessible memory medium of claim 17, wherein the authentication data comprises secure random data.

21. The non-transitory computer accessible memory medium of claim 17, wherein the message further comprises:
  control elements for controlling the presentation of said information to said user, wherein said presenting the information comprises using the control elements.

22. The non-transitory computer accessible memory medium of claim 17, wherein the message is written in a markup language.

23. The non-transitory computer accessible memory medium of claim 17, wherein said automatically executing the authentication procedure instructions comprises performing digital signing with an authentication token.

24. The non-transitory computer accessible memory medium of claim 17, wherein the authentication procedure instructions are written in a script language.

25. The method of claim 5, wherein the control elements are indicators or tags written in a markup language.

26. The non-transitory computer accessible memory medium of claim 13, wherein the control elements are indicators or tags written in a markup language.

27. The method of claim 1, wherein the authentication procedure instructions are executable to invoke an applet stored by the computer system.

28. The method of claim 27, wherein the applet is executable to automatically initiate the automated authentication signing procedure and insert the data, after being digitally signed, into information to be posted back to the computer system.

29. The non-transitory computer accessible memory medium of claim 9, wherein the authentication procedure instructions are executable to invoke an applet stored by a computer server.

30. The non-transitory computer accessible memory medium of claim 29, wherein the applet is executable to automatically initiate the automated authentication signing procedure and insert the data, after being digitally signed, into information to be posted back to the computer server.

* * * * *

UNITED STATES PATENT AND TRADEMARK OFFICE
CERTIFICATE OF CORRECTION

| | | Page 1 of 1 |
|---|---|---|
| PATENT NO. | : 8,819,253 B2 | |
| APPLICATION NO. | : 10/293199 | |
| DATED | : August 26, 2014 | |
| INVENTOR(S) | : Simeloff et al. | |

It is certified that error appears in the above-identified patent and that said Letters Patent is hereby corrected as shown below:

In the Specification

In column 8, line 15, delete "user" and insert -- user. --, therefor.

In column 12, line 39, delete "device" and insert -- device. --, therefor.

In column 16, line 7, delete "device" and insert -- device. --, therefor.

In column 18, line 65, delete "invention" and insert -- invention. --, therefor.

Signed and Sealed this
Tenth Day of March, 2015

Michelle K. Lee
*Deputy Director of the United States Patent and Trademark Office*